MARIO A. ACITELLI
GERALD E. BLAIR
INVENTORS

3,102,197
RADIATION DOSIMETRY AND PLASTICS COMPOSITIONS THEREFOR

Mario A. Acitelli, Oakfield, and Gerald E. Blair, Pittsford, N.Y., assignors to Bausch & Lomb Incorporated, Rochester, N.Y., a corporation of New York
Filed Dec. 12, 1960, Ser. No. 75,142
5 Claims. (Cl. 250—83)

This invention relates to a novel method of high energy radiation dosimetry and to novel plastics for use therewith.

Radiation dosimetry is of increasing commercial importance not only for purposes of safeguarding personnel, but also for purposes of measuring the amounts of radiation received by products, such as articles of food, that may be subjected to radiation for any of various different purposes. At present the most common method for measuring radiation involves the use of photographic emulsions which must be developed under accurately controlled conditions, and are therefore relatively expensive. The inconvenience and relatively high costs of photographic emulsion type dosimeters have resulted in a search for simpler, cheaper, and more convenient dosimeter methods and devices. For example, a silver activated glass has been developed by Shulman et al. as described in their United States Patent, No. 2,524,839, which provides a measure of the high energy radiation to which it has been exposed by the intensity of its luminescence in response to ultra-violet excitation.

The Shulman et al. glasses are subject to certain limitations when used for dosimeters because of their response characteristics. In many dosimeter applications it is desired to measure the effect of high energy radiation on organic materials such as, for example, body tissues and foods such as meat. In many instances it is desirable to use a dosimeter material as closely equivalent in composition as possible to the specimen that is subjected to radiation.

According to the present invention it has now been found that the colors, and more particularly, the optical densities of certain internally dyed plastics are affected by exposure to high energy radiation in a regular and reproducible manner. The plastics are of organic composition and are therefore much more nearly tissue equivalent than the prior art glass dosimeter materials, yet they have similar advantages to the glass in that they are inexpensive to manufacture and to use. Their change in color or increase in optical density may be readily and quickly determined by non-destructive means. They are sensitive over a relatively wide dosage range and may be used continuously over relatively long periods of time with readings being made at intervals therein.

The invention will now be described in greater detail in connection with the accompanying drawing wherein.

The materials that have been found useful in the present invention are relatively hard, thermosetting, transparent plastics such as those described in the co-pending application of C. A. Sheld, Ser. No. 32,723, filed May 31, 1960, that are internally dyed. In addition to the coloring materials specified in the Sheld application, the present invention also contemplates the use of an azine dye for coloring such thermosetting transparent plastics. Presently known transparent thermosetting plastics are relatively difficult to color internally because of their polymerization characteristics, which require the use of strongly oxydizing catalysts. Such catalysts tend to destroy most dyes.

Example 1

A dosimeter material according to a first embodiment of the invention may be made as follows. About 5 parts by weight of cobalt naphthanate is dissolved in 15 parts by weight of liquid allyl methacrylate. The solution so formed is added to about 850 parts by weight of a monomer known commercially as CR–39. A dark, oily precipitate is formed by this addition, which is removed by filtering the mixture through relatively coarse filter paper. About three parts by weight of isopropyl percarbonate, or other suitable catalyst is added. The mixture is then placed in a mold, and cured by heating at 105° F. for about 16 hours, and then at 140° F. for 4 hours additional.

Figure 1:
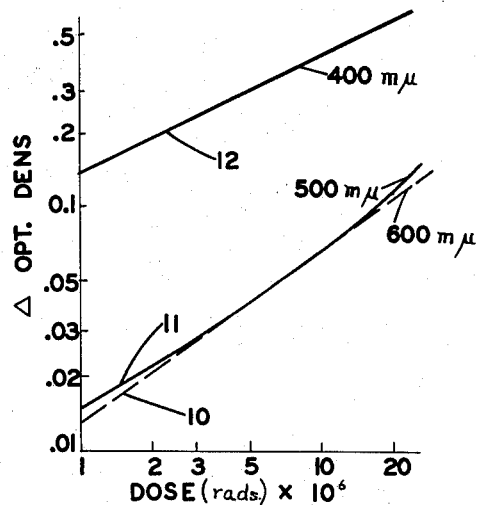
FIG. 1 is a graph showing radiation induced changes in optical density of a first material according to the invention.

The cured casting is yellow-green in color and transparent. The chart shown in FIG. 1 illustrates the change in optical density of the casting produced by various different exposures to high energy radiation. The optical density changes are given for light at three different wave lengths. The curve 10 illustrates the effect of radiation on the optical density of the body for light of 600 millimicron wave length. The curves 11 and 12 illustrate, respectively, the effects on density with respect to light of 500 and 400 millimicrons wave length. It is seen that, particularly with respect to the 600 and 400 millimicron measurements, the optical density varies in a relatively linear fashion as a function of the logarithm of the radiation exposure.

CR–39 is the trade name for the monomer in liquid form of diethylene glycol bis-allyl carbonate, and is available from the Columbia Southern Chemical Co., Barberton, Ohio.

Example 2

A dosimeter material according to a second embodiment of the invention may be made of the following ingredients, parts by weight basis:

| | |
|---|---:|
| Copper oleate | 1.5 |
| Cobalt naphthanate | 5.5 |
| Paraplex 444 polyester resin | 22.0 |
| Diallyl diglycolate | 71.0 |
| Isopropyl percarbonate | 6.0 |

The cobalt and copper compounds are dissolved separately in aliquote portions of the polyester resin and the diallyl diglycolate. The two solutions are combined and then filtered. The isopropyl percarbonate catalyst is added to the clear filtrate, which is then cast in the form of flat sheets about 2 mm. thick. Polymerization is effected by heating for 16 hours at 105° F., following which the temperature is gradually increased over a period of about 8 hours to about 185° F.

Figure 2:
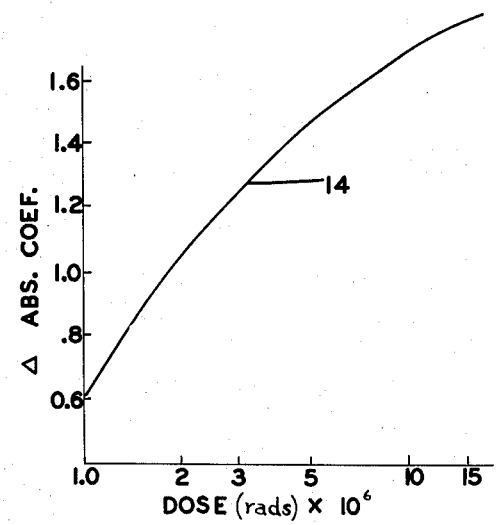
FIG. 2 is a graph showing radiation induced changes in optical density as indicated by the light absorption coefficient of a second material according to the invention.

The sheets so formed may be cut into relatively small pieces, each one of which constitutes a radiation dosimeter. The change in the absorption coefficient induced by exposure to high energy radiation for this sheet material is illustrated by the curve 14 in FIG. 2. It will be seen from this figure that the relationship is relatively linear between the increase in the absorption coefficient of the material and the logarithm of the radiation exposure up to a value of about $10^7$ rads. At this point, a saturation effect begins to appear.

Example 3

A dosimeter material according to the presently preferred embodiment of the invention may be made of the following ingredients, parts by weight basis:

| | |
|---|---|
| Ethylene glycol maleate | 9.8 |
| CR-39 | 85.5 |
| Calcocid fast blue dye | 2.7 |
| Diisopropyl percarbonate | 5 |

Calcocid fast blue dye is a dye of the azine class, in which the chromophore is the pyrazine ring. The dye is classified by color index as a benzophenylsafranine.

The Calcocid fast blue dye is added to the ethylene glycol maleate and stirred until dissolved. The CR-39 is then added, and the resultant solution filtered. The percarbonate is then added, and the solution filtered again, whereupon it is cast in sheet form and cured by heating according to the following cycle:

64 hrs. at 103° F.
1¼ hrs. at 145° F.
¼ hr. at 195° F.

The cured sheet material is cut into pieces of convenient size for dosimeter use.

Figure 3:
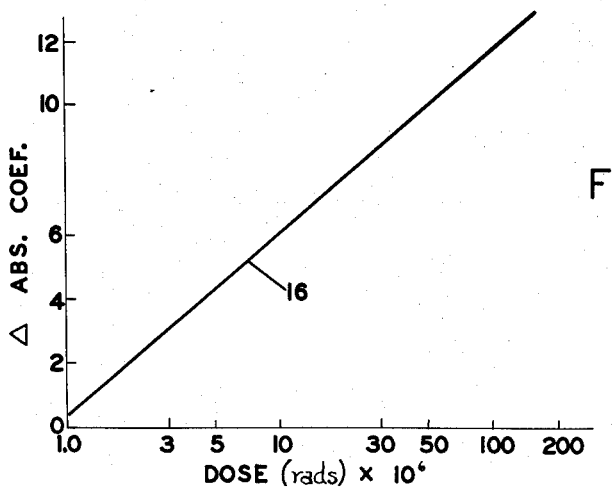
FIG. 3 is a graph showing radiation induced changes in optical density as indicated by the light absorption coefficient of a third material according to the invention.

The change in absorption coefficient of this material as a function of the logarithm of its exposure to high energy radiation is relatively linear as shown by the curve 16 of FIG. 3.

All of the materials according to the invention are primarily organic plastics and, therefore, much more nearly tissue equivalent than previous inorganic dosimeter materials such as glass. In addition, the materials are inexpensive to manufacture, simple and convenient to use, and provide relatively accurate dosimeter indications.

It is believed that the opacifying effect of the high energy radiation is primarily due to the dyes included in the plastics, but the nature of the plastics is important in affecting the reaction of the dyes to the high energy radiation.

What is claimed is:

1. Method of radiation dosimetry comprising the step of subjecting a body of a transparent organic plastic containing an organic dye throughout its mass to radiation, and the step of measuring the change in optical density produced by exposure to high energy radiation of the body of a transparent organic plastic containing an organic dye distributed throughout its mass, said plastic being a copolymer of allyl methacrylate and diethylene glycol bis allyl carbonate, and said dye being cobalt naphthenate.

2. Method of radiation dosimetry comprising the step of subjecting a body of a transparent organic plastic containing an organic dye throughout its mass to radiation, and the step of measuring the change in optical density produced by exposure to high energy radiation of the body of a transparent organic plastic containing an organic dye distributed throughout its mass, said plastic being a copolymer of polyester resin and diallyl diglycolate, and said dye being a mixture of copper oleate and cobalt naphthenate.

3. Method of radiation dosimetry comprising the step of subjecting a body of a transparent organic plastic containing an organic dye throughout its mass to radiation, and the step of measuring the change in optical density produced by exposure to high energy radiation of the body of a transparent organic plastic containing an organic dye distributed throughout its mass, said plastic being a copolymer of ethylene glycol maleate and diethylene glycol bis allyl carbonate, and said dye being of the azine class and classified by color index as a benzophenylsafranine, the chromophore of said dye being the pyrazine ring.

4. A dosimeter material sensitive to high energy radiation consisting essentially of a copolymer of ethylene glycol maleate and diethylene glycol bis allyl carbonate, said material including a dye of the azine cass distributed throughout its mass and having the property of undergoing a change in optical density upon exposure of said material to radiation.

5. A dosimeter material sensitive to high energy radiation consisting essentially of the polymerization product of, parts by weight basis:

| | |
|---|---|
| Ethylene glycol maleate | 9.8 |
| Diethylene glycol bis allyl carbonate | 85.5 |
| Dye of the azine class classified by color index as a benzophenylsafranine, the chromophore being the pyrazine ring | 2.7 |
| Diisopropyl percarbonate | 5 |

References Cited in the file of this patent

UNITED STATES PATENTS

| | | |
|---|---|---|
| 2,882,415 | Pressan | Apr. 14, 1959 |
| 2,934,651 | Etzel et al. | Apr. 26, 1960 |
| 2,945,954 | Gaugler | July 19, 1960 |
| 2,962,592 | Hoecker et al. | Nov. 29, 1960 |
| 2,967,241 | Hoecker | Jan. 3, 1961 |
| 3,031,575 | Gevantman et al. | Apr. 24, 1962 |

OTHER REFERENCES

Birnbaum et al.: "Use of Melamine as an X-Radiation Detector," Review of Scientific Instruments, May 1955, pages 457 to 459.

Artandi: "Plastic Dosimetry," Nucleonics, October 1959, pages 62 and 63.